US008726191B2

(12) United States Patent
Molander et al.

(10) Patent No.: US 8,726,191 B2
(45) Date of Patent: May 13, 2014

(54) EPHEMERAL OBJECT SELECTIONS AND FAST-PATH GESTURING FOR DEVICE CONTROL

(75) Inventors: Mark Molander, Research Triangle Park, NC (US); Todd Eischeid, Research Triangle Park, NC (US); Patrick Bohrer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 13/113,446

(22) Filed: May 23, 2011

(65) Prior Publication Data

US 2012/0304086 A1    Nov. 29, 2012

(51) Int. Cl.
*G06F 15/00*   (2006.01)
*G06F 13/00*   (2006.01)

(52) U.S. Cl.
USPC ........................................ 715/831; 715/737

(58) Field of Classification Search
USPC .................. 715/702, 863, 851, 853, 840, 856
See application file for complete search history.

(56) References Cited

U.S. PATENT DOCUMENTS

| | | | |
|---|---|---|---|
| 7,663,607 B2 | 2/2010 | Hotelling et al. | |
| 2010/0107067 A1* | 4/2010 | Vaisanen | 715/702 |
| 2010/0164891 A1 | 7/2010 | Hill et al. | |
| 2010/0192109 A1* | 7/2010 | Westerman et al. | 715/863 |
| 2010/0251116 A1 | 9/2010 | Rimas-Ribikauskas et al. | |

OTHER PUBLICATIONS

Justin Matejka, The Design and Evaluation of Multi-Finger Mouse Emulation Techniques, Proceedings of the 27th international conference on Human factors in computing systems, 2009, ACM.
Tovi Grossman, Hover Widgets: Using the Tracking State to Extend the Capabilities of Pen-Operated Devices, Proceedings of the SIGCHI conference on Human Factors in computing systems, 2006, ACM.
IBM TDB, Method for Enabling Hover Help and Right Button Clicks Using a Touch Screen, IPCOM000015370D, Nov. 16, 2001, IP.com.

* cited by examiner

*Primary Examiner* — Cao "Kevin" Nguyen
(74) *Attorney, Agent, or Firm* — Suiter Swantz pc llo

(57) ABSTRACT

A device may be controlled by: detecting a first user input associated with an element of a graphical user interface associated with at least one controllable device; detecting at least one second user input; and transmitting at least one device control signal to the at least one controllable device associated with the element of the graphical user interface when the first user input and the second user input are at least partially contemporaneous.

17 Claims, 19 Drawing Sheets

EPHEMERAL OBJECT SELECTIONS AND FAST-PATH GESTURING FOR DEVICE CONTROL

BACKGROUND

Gesturing is a quickly emerging user interface (UI) input mechanism. Such inputs may be applicable to various devices that include touch screen-based UIs and, more particularly, multi-touch devices (e.g. hand-held/mobile devices such as touch-screen enabled smart phones and tablet computers, large mounted displays, and the like).

Further, traditional UIs (e.g. those associated with mouse or track pad-based inputs) may employ "fly-over" or "hover" functionality where a given user action associated with a UI pointer (e.g. positioning a mouse cursor over a UI icon) may result in an ephemeral selection of the icon (e.g. a temporary display of a tool tip associated with a UI icon while a mouse cursor hovers over the UI icon). The selection of the icon may be characterized as ephemeral in that it may be automatically hidden following movement of the UI pointer away from the icon.

SUMMARY

A device may be controlled by: detecting a first user input associated with an element of a graphical user interface associated with at least one controllable device; detecting at least one second user input; and transmitting at least one device control signal to the at least one controllable device associated with the element of the graphical user interface when the first user input and the second user input are at least partially contemporaneous.

DETAILED DESCRIPTION

Figure 1:
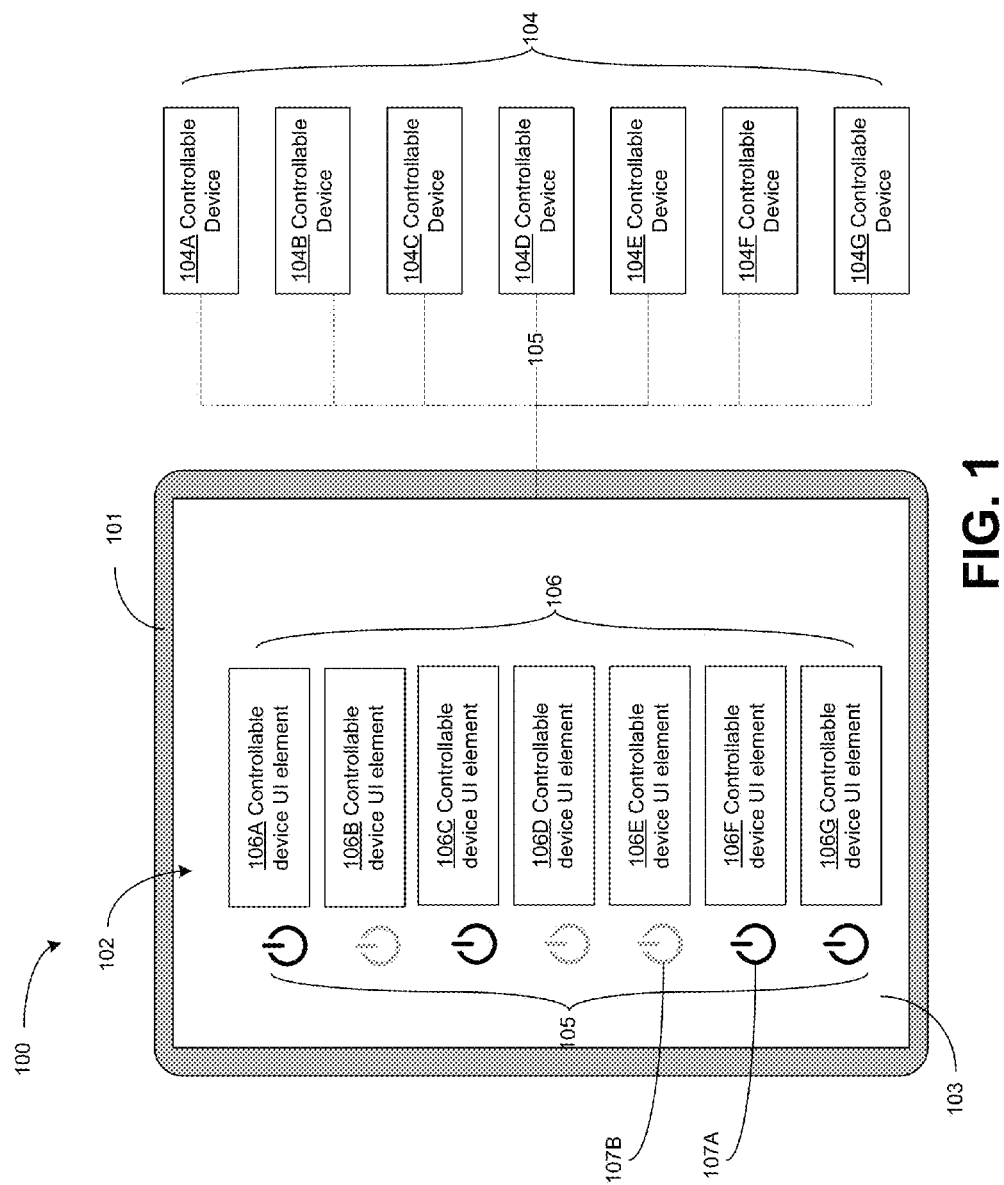
FIG. 1 depicts a system for controlling devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present invention is directed to systems and methods that provide for ephemeral selection of UI objects (e.g. UI icons) with gesture-based input devices such as touch and multi-touch input devices.

Referring to FIG. 1, a system 100 for receiving gesture-based user inputs is shown. The system 100 may include a gesture-based input device 101 (e.g. a touch-screen enabled tablet computer, smart phone, and the like) which may be configured (e.g. running software and/or firmware; employing application specific circuitry) to display a UI 102 under a touch-sensitive screen 103. The gesture-based input device 101 may be operably connected (e.g. wirelessly via Wi-Fi, Bluetooth, and or cellular data connections; wired via Ethernet; etc.) to one or more one or more controllable devices 104 (e.g. server, storage, or networking nodes in a data center, audio/video equipment, etc.). The gesture-based input device 101 may provide device control signals 105 to the controllable devices 104 according to one or more user inputs detected by the gesture-based input device 101 that are associated with an element of the UI 102 associated with a controllable device 104 (e.g. a graphical or textual representation of a controllable device 104 displayed by the UI 102).

For example, as shown in FIG. 1, a UI 102 may be provided that is associated with a status (e.g. the power status) of one or more controllable devices 104 (e.g. server nodes). The UI 102 may display one or more controllable device UI elements 106 associated with controllable devices 104. Each controllable device UI element 106 may have an associated device status UI element 107 indicative of a power status of a controllable device 104 associated with a given controllable device UI element 106. For example, a device status UI element 107 in a first state (e.g. device status UI element 107A in an illuminated state) may be indicative of a controllable device 104 device that is currently powered on. A device status UI element 107 in a second state (e.g. device status UI element 107B in a non-illuminated state) may be indicative of a controllable device 104 that is currently powered off.

It may be desirable to manage control operations (e.g. power-related operations) of the one or more controllable devices 104 via the UI 102 presented on the gesture-based input device 101.

Figure 2:
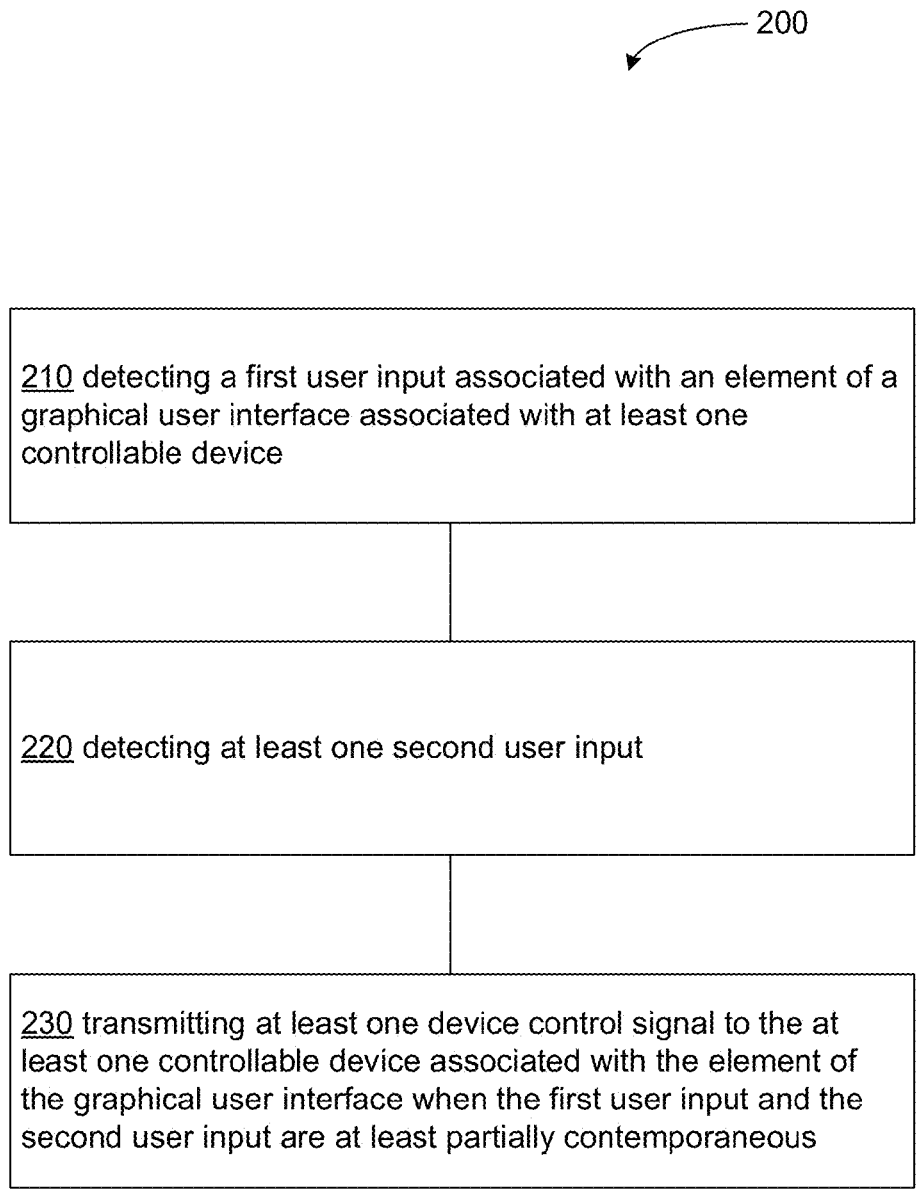
FIG. 2 depicts a method for controlling devices.

FIG. 2 illustrates an operational flow 200 representing example operations related to control operations for a controllable device 104 initiated by a gesture-based input device 101. In FIG. 2, discussion and explanation may be provided with respect to the above-described examples of FIG. 1, and/or with respect to other examples and contexts. However, it should be understood that the operational flows may be executed in a number of other environments and contexts, and/or in modified versions of FIG. 1. In addition, although the various operational flows are presented in the sequence(s) illustrated, it should be understood that the various operations may be performed in other orders than those that are illustrated, or may be performed concurrently.

Figure 3:
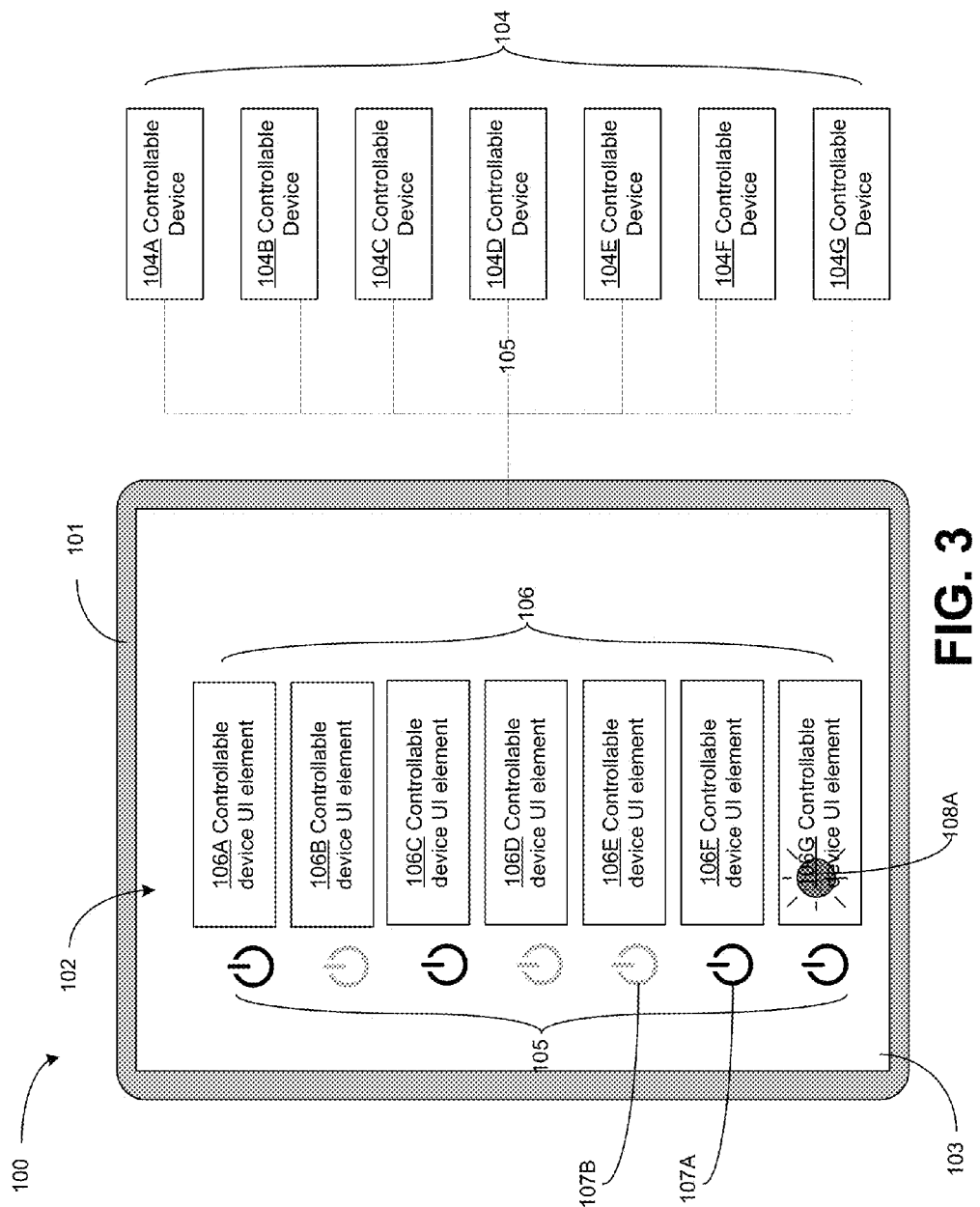
FIG. 3 depicts a system for controlling devices.

Operation 210 illustrates detecting a first user input associated with an element of a graphical user interface associated with at least one controllable device. For example, as shown in FIG. 1, the gesture-based input device 101 may display a UI 102 including one or more controllable device UI elements 106 associated with one or more controllable devices 104. The gesture-based input device 101 may receive a user input (e.g. a user touch applied to a surface of a touch-sensitive screen 103 of the gesture-based input device 101) associated with a particular controllable device UI element 106 (e.g. a user touch to the touch-sensitive screen 103 that corresponds to a location on the UI 102 where a controllable device UI element 106 is displayed). Referring to FIG. 3, an illustrated view of a user input 108A associated with a controllable device UI element 106G is shown. The user input 108A may be characterized by an at least substantially constant application of pressure (e.g. at no point does the user remove their finger from the surface entirely). Further, the user input 108A may be a substantially static user input (e.g. upon touching the touch-sensitive screen 103, a user's finger may remain in a substantially stationary location with respect to the touch-sensitive screen 103 the tracing of user input 108A).

Figure 4:
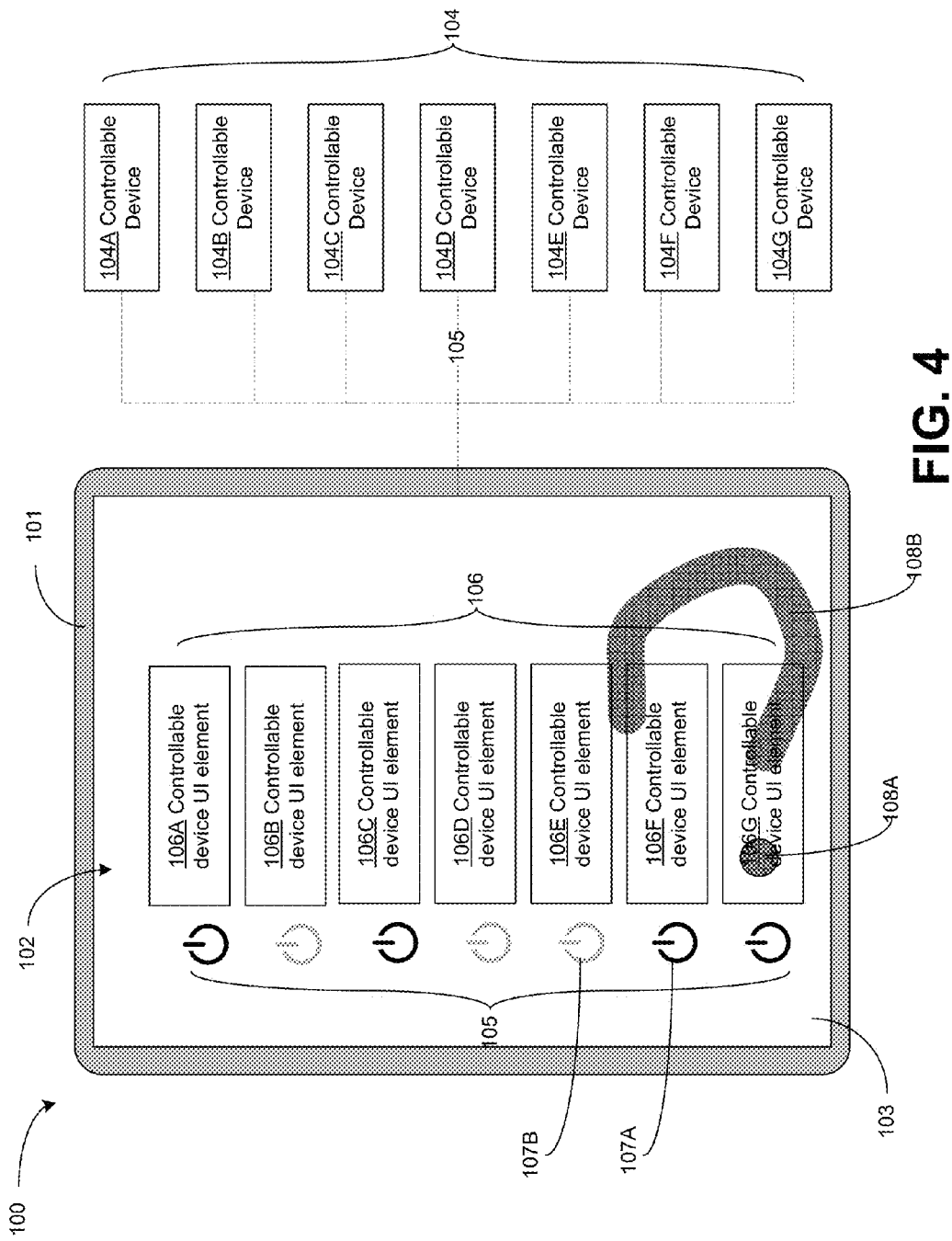
FIG. 4 depicts a system for controlling devices.

Operation 220 illustrates detecting at least one second user input. For example, as shown in FIG. 1, the gesture-based input device 101 may receive a second user input (e.g. a user touch applied to a surface of a touch-sensitive screen 103 of the gesture-based input device 101). As shown in FIG. 4, the second user input 108B may be at least partially associated with a particular controllable device UI element 106 (e.g. a user touch to the touch-sensitive screen 103 that corresponds to a location on the UI 102 where a controllable device UI element 106 is displayed). Alternately, the second user input 108B may be made at any location on the touch-sensitive screen 103 without regard to the location of the controllable device UI element 106). The second user input 108B may be characterized by an at least substantially constant application of pressure (e.g. at no point does the user remove their finger from the surface entirely). Further, the second user input 108B may be a dynamic user input (e.g. upon touching the touch-sensitive screen 103, a user may move their finger across the touch-sensitive screen 103 in one or more directions such as shown by the tracing of user input 108B).

Operation 230 illustrates transmitting at least one device control signal to the at least one controllable device associated with the element of the graphical user interface when the first user input and the second user input are at least partially contemporaneous. As described above, it may be desirable to control one or more controllable devices 104 according to touch-based inputs received by the gesture-based input device 101. As shown in FIG. 4, upon receipt of a the first user input 108A associated with controllable device UI element 106G and the second user input 108B, the gesture-based input device 101 may provide one or more control signals 105 to a controllable device 104G according to the first user input 108A and the second user input 108B. It may be the case that the control signals 105 are provided to the controllable device 104G only when the first user input 108A and the second user input 108B occur at least partially contemporaneously (e.g. at least some degree of temporal overlap occurs between the actuation of the touch-sensitive screen 103 during the first user input 108A and the actuation of the touch-sensitive screen 103 during the second user input 108B).

Such a requirement of at least partially contemporaneous user inputs may serve to distinguish device control operations initiated by the gesture-based input device 101 from non-device control operations associated with the controllable device UI element 106G. For example, it may be the case that, upon receipt of a first user input 108A that is non-contemporaneous with the second user input 108B (e.g. a user depresses the touch-sensitive screen 103 following first user input 108A prior to pressing the touch-sensitive screen 103 to initiate second user input 108B) the gesture-based input device 101 may execute one or more non-device control operations. Such non-device control operations may include displaying a second graphical user interface hierarchically dependent from the element of the graphical user interface associated with the controllable device in response to the first user input when the first user input and the second user input are non-contemporaneous. For example, upon receipt of a first user input 108A that is not contemporaneous with the second user input 108B, the gesture-based input device 101 may display a second UI that is hierarchically dependent from the controllable device UI element 106 selected by the first user input 108A (e.g. the second UI may provide a "drill-down" view including UI elements specific to a controllable device 104 associated with the controllable device UI element 106 selected by the first user input 108A such as power status, operating temperature, data processing rates, I/O error status, and the like).

As described above, when a first user input 108A and a second user input 108B occur, at least partially simultaneously, the gesture-based input device 101 may provide one or more control signals 105 to a controllable device 104 according to the first user input 108A and the second user input 108B. The specific nature of those control signals 105 may be a function of the particular user movements associated with those user inputs.

For example, as shown in FIG. 4, the second user input 108B may trace an at least partially circular shape. Detection of such an at least partially circular second user input 108B may cause the gesture-based input device 101 may provide one or more control signals 105 to a controllable device 104 directing the controllable device 104 to power off.

Figure 5:
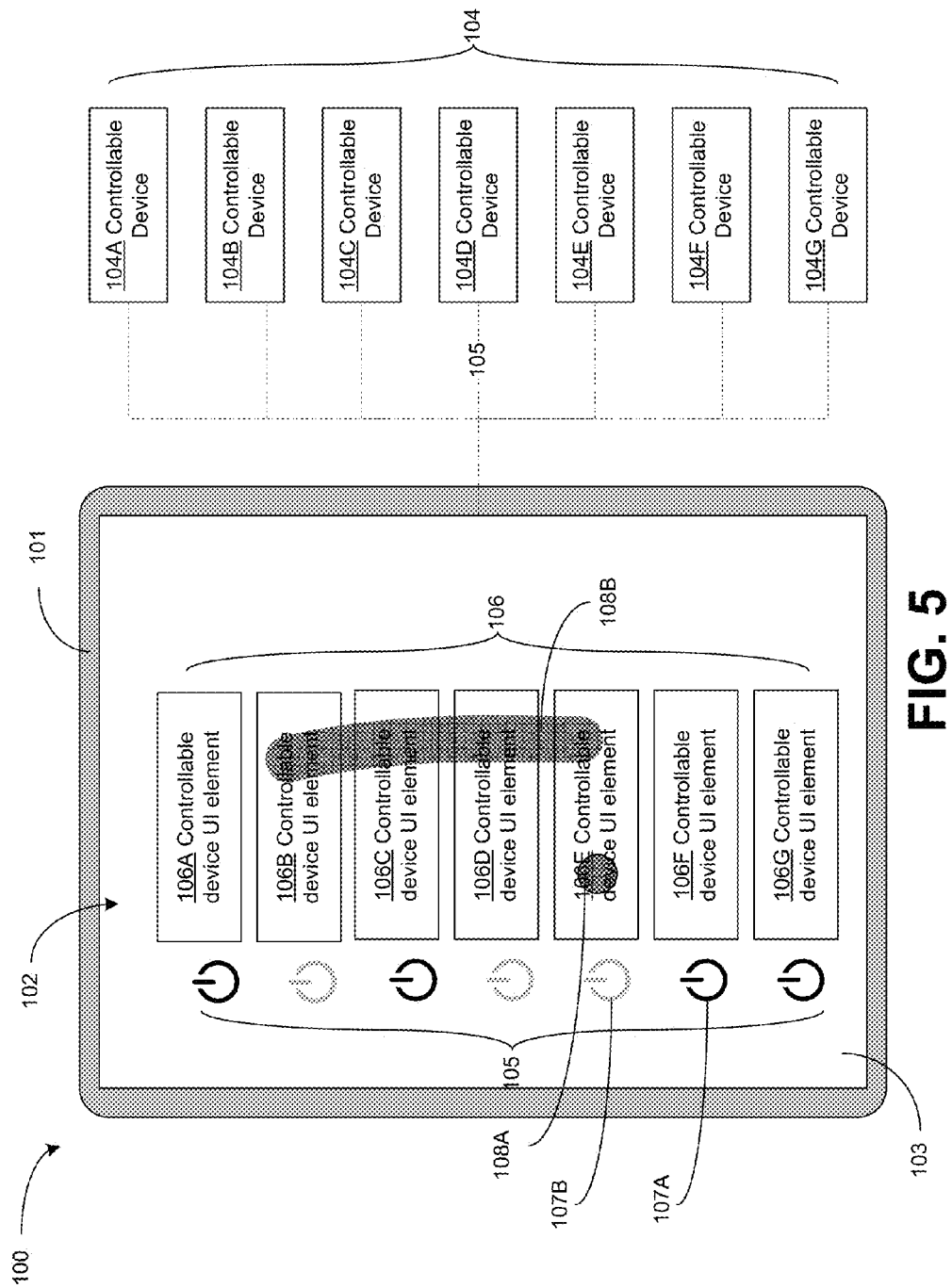
FIG. 5 depicts a system for controlling devices.

Still further, as shown in FIG. 5, the second user input 108B may trace a substantially vertical linear shape. Detection of such a substantially vertical linear second user input 108B may cause the gesture-based input device 101 may provide one or more control signals 105 to a controllable device 104 directing the controllable device 104 to power on.

Figure 6:
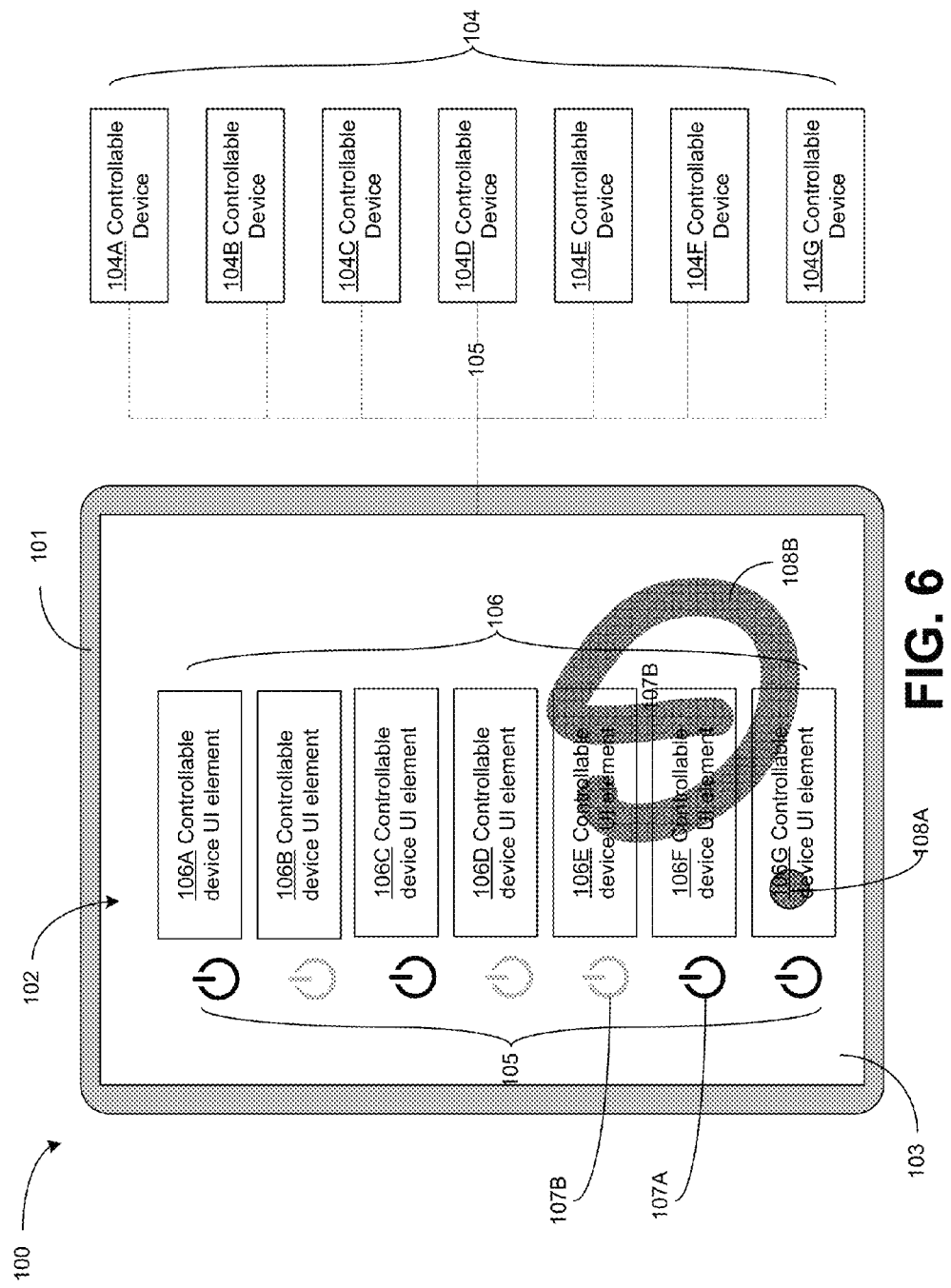
FIG. 6 depicts a system for controlling devices.

Still further, as shown in FIG. 6, the second user input 108B may trace a substantially circular shape followed by a substantially vertical linear shape. Detection of a user input 108B including a substantially circular shape followed by a substantially vertical linear shape may cause the gesture-based input device 101 to provide one or more control signals 105 to a controllable device 104 directing the controllable device 104 to restart.

Figure 7:
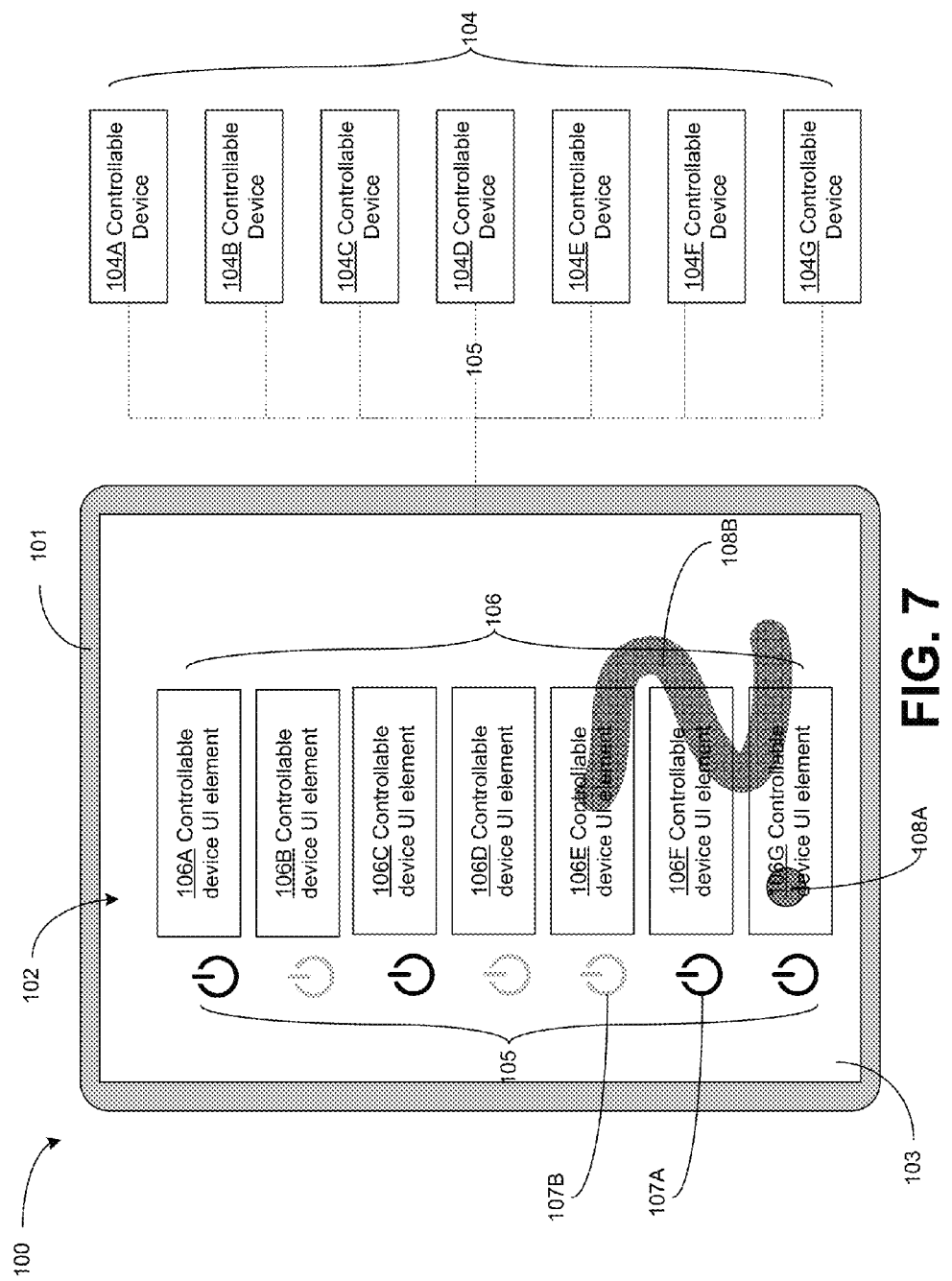
FIG. 7 depicts a system for controlling devices.

Still further, as shown in FIG. 7, the second user input 108B may provide a substantially z-shaped input. Detection of a substantially z-shaped user input 108B may cause the gesture-based input device 101 provide one or more control signals 105 to a controllable device 104 directing the controllable device 104 to enter a sleep mode.

Figure 8:
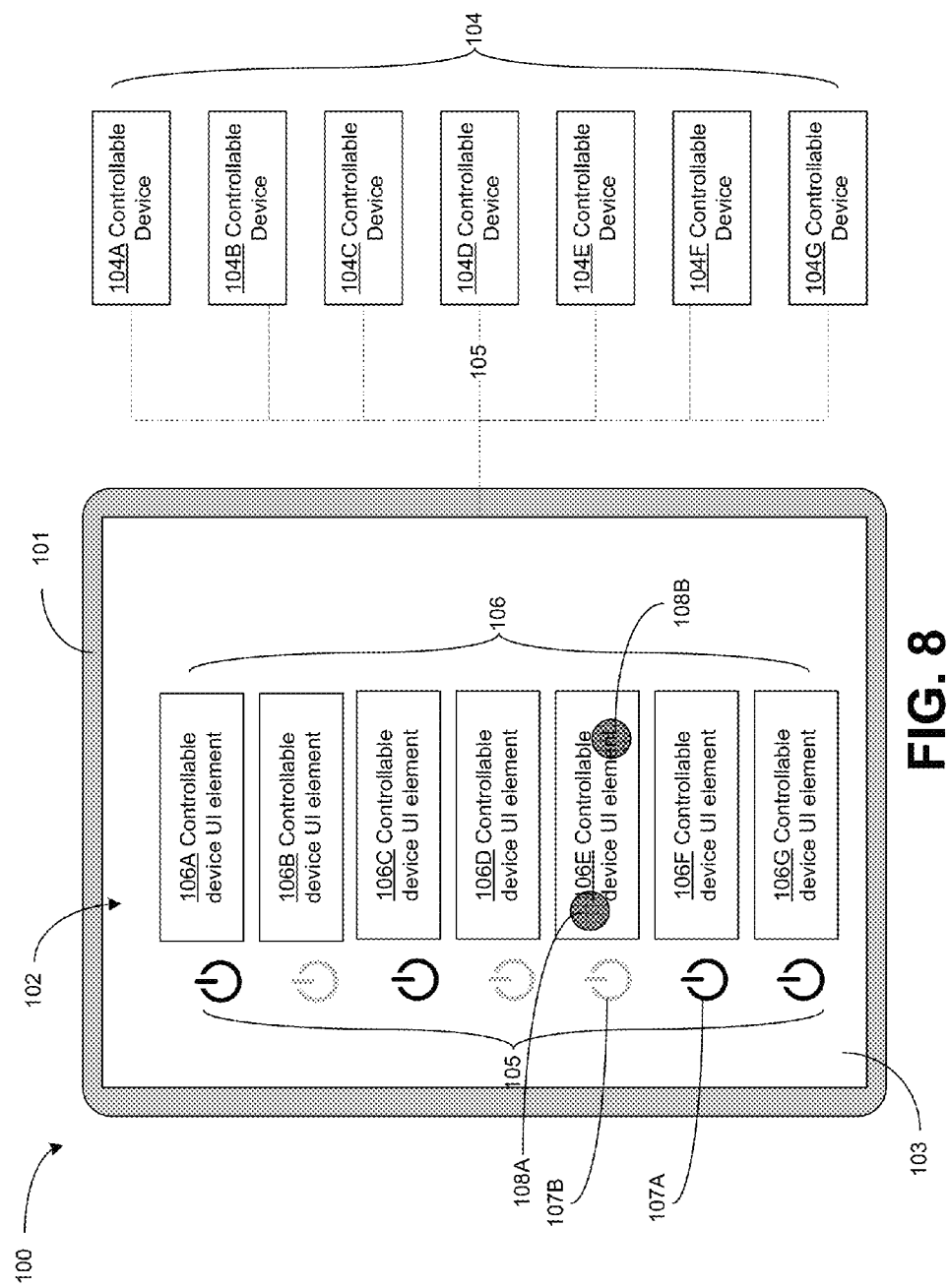
FIG. 8 depicts a system for controlling devices.

Still further, as shown in FIG. 8, the second user input 108B may provide a triple-tap input. Detection of a triple-tap user input 108B may cause the gesture-based input device 101 provide one or more control signals 105 to a controllable device 104 directing the controllable device 104 to exit a sleep mode.

Figure 9:
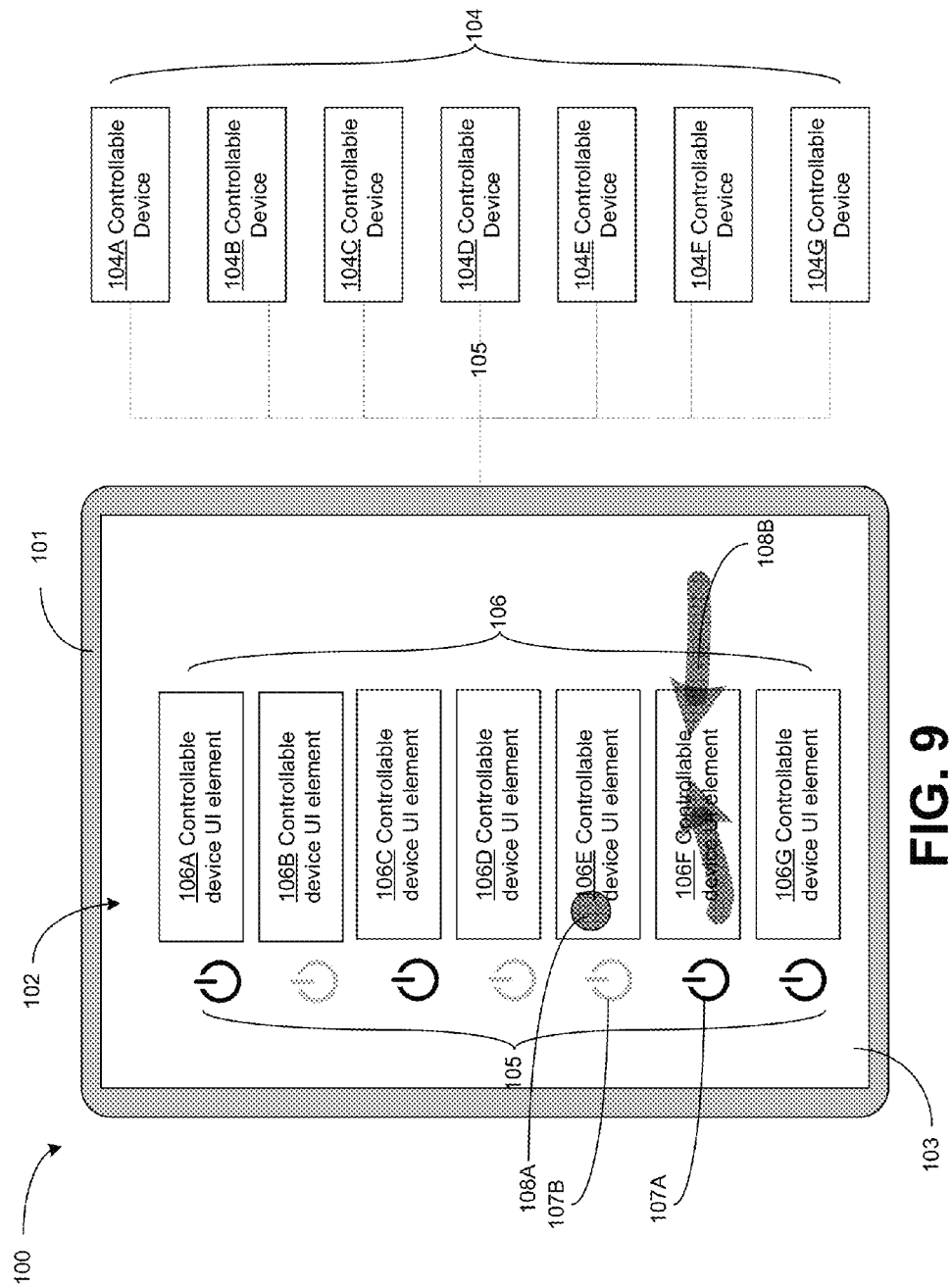
FIG. 9 depicts a system for controlling devices.

Still further, as shown in FIG. 9, the second user input 108B may provide a pinching input. Detection of a pinching user input 108B (e.g. employing two fingers) may cause the gesture-based input device 101 provide one or more control signals 105 to a controllable device 104 directing the controllable device 104 to exit a throttle down various controllable device 104 functions (e.g. processing speed, fan speed, etc.).

Figure 10:
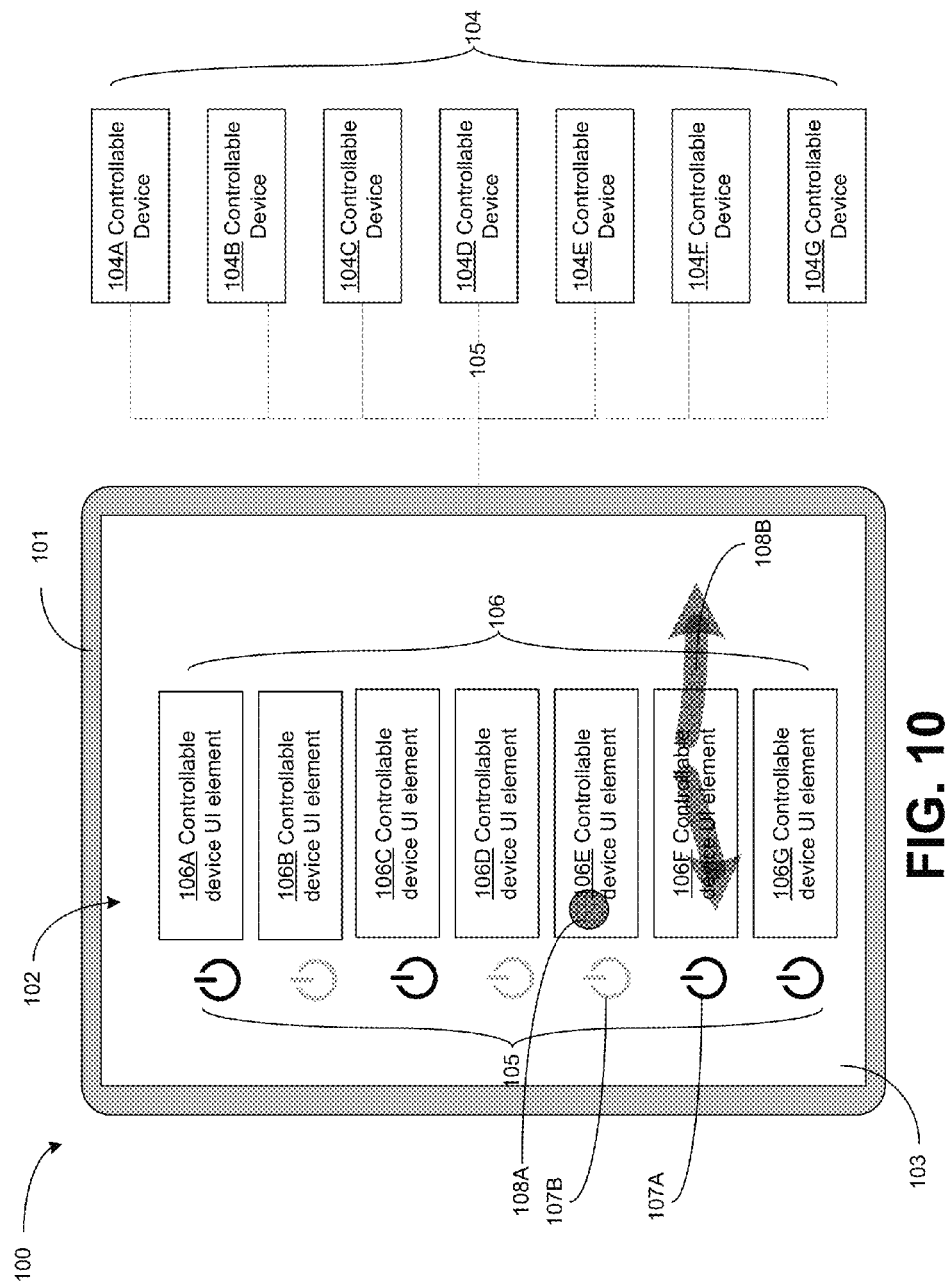
FIG. 10 depicts a system for controlling devices.

Still further, as shown in FIG. 10, the second user input 108B may provide a spreading input. Detection of a spreading user input 108B (e.g. employing two fingers) may cause the gesture-based input device 101 provide one or more control signals 105 to a controllable device 104 directing the controllable device 104 to exit a throttle down various controllable device 104 functions (e.g. processing speed, fan speed, etc.).

As described above with respect to FIGS. 3-10, the specific nature of the control signals 105 provided by may be a function of the particular user movements associated with those user inputs. For example, first user input 108A and the second user input 108B may be user inputs made by two or more fingers of a user. Particularly, the first user input 108A may be a user input made by a first finger on a first hand of the user and the second user input 108B may be a user input made by a second finger on the first hand of the user. Alternately, the second user input 108B may be a user input made by a first finger on a second hand of the user.

In an alternate embodiment, it may be desirable to provide device control functionality for controllable devices 104 analogous to those described above but with single-touch user inputs as compared to the previously described multi-touch user inputs.

Figure 11:
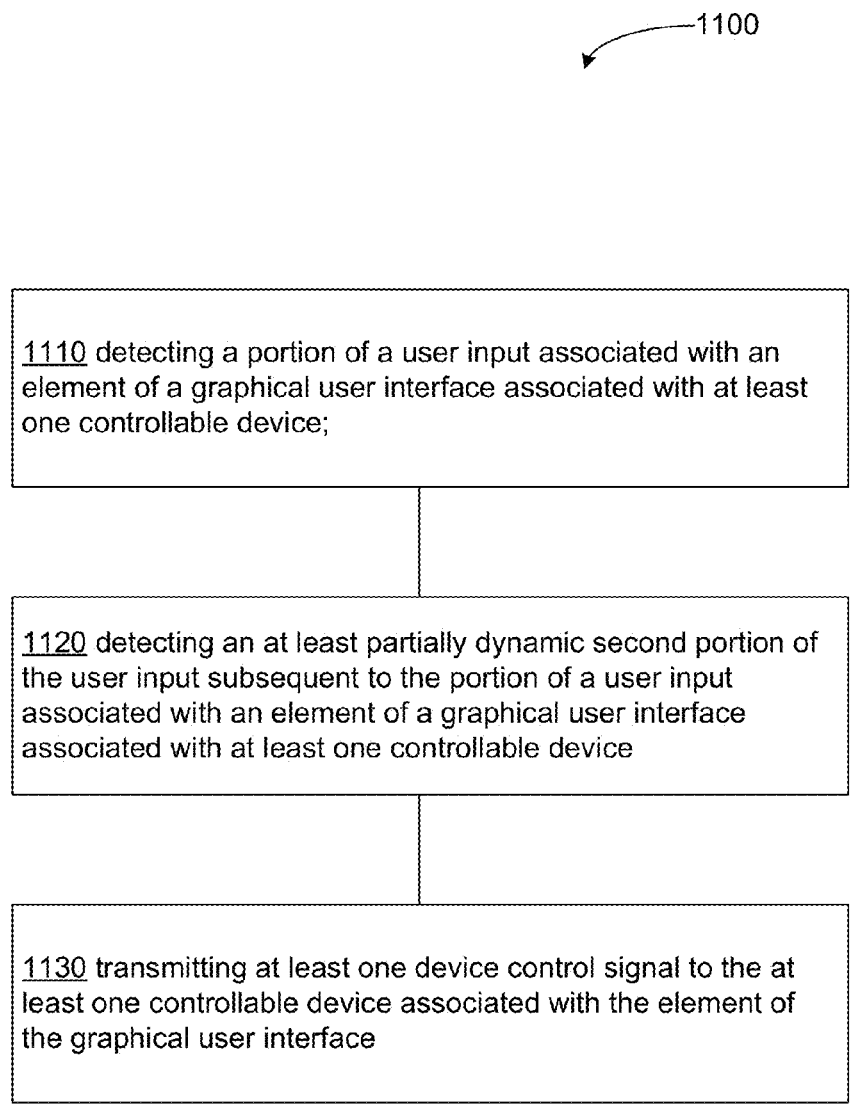
FIG. 11 depicts a method for controlling devices.

FIG. 11 illustrates an operational flow 1100 representing example operations related to control operations for a controllable device 104 initiated by a gesture-based input device 101 is shown.

Figure 12:
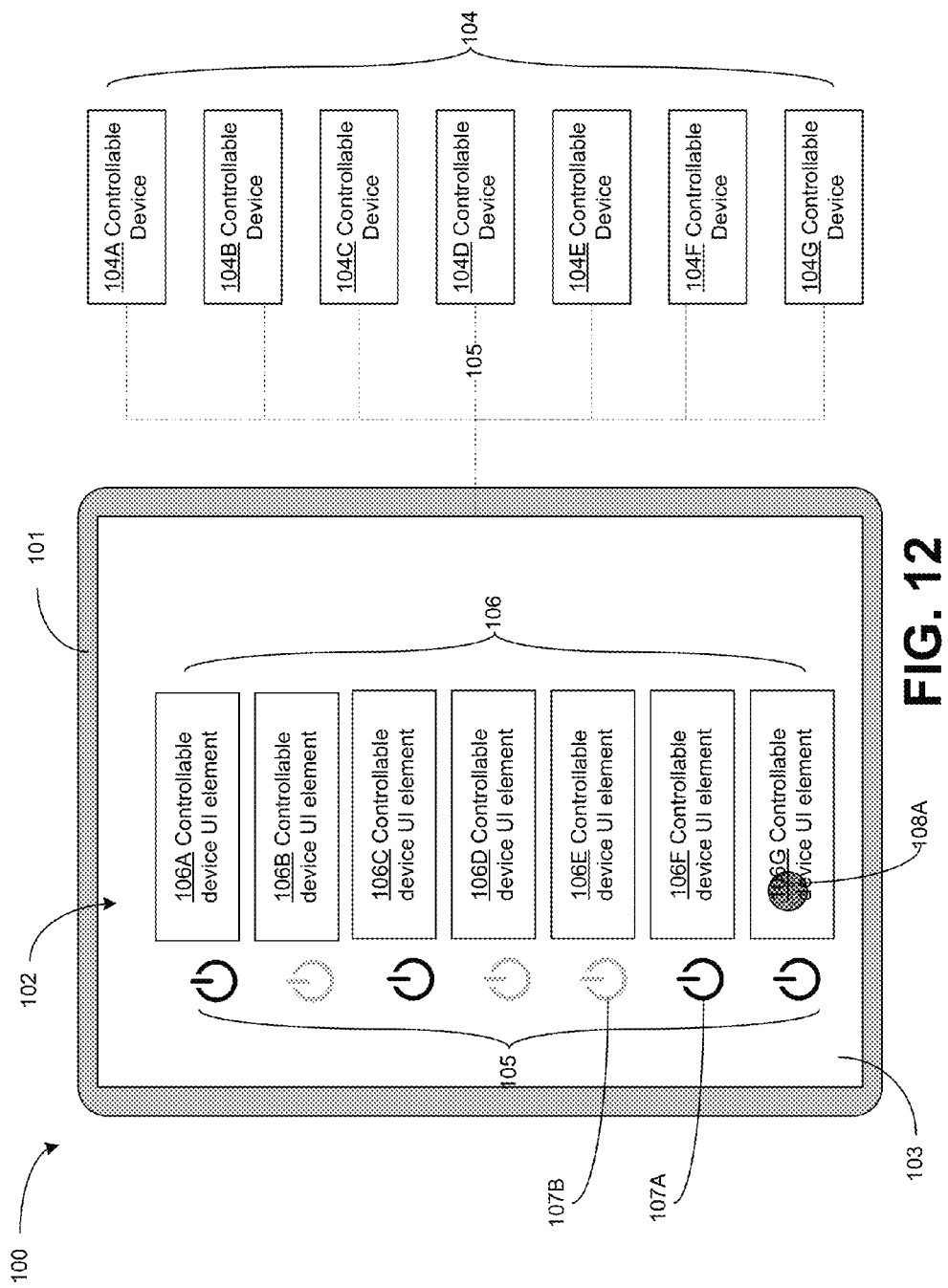
FIG. 12 depicts a system for controlling devices.

Operation 1110 illustrates detecting a portion of a user input associated with an element of a graphical user interface associated with at least one controllable device. For example, as shown in FIG. 12, the gesture-based input device 101 may display a UI 102 including one or more controllable device UI elements 106 associated with one or more controllable devices 104. The gesture-based input device 101 may receive a user input (e.g. a user touch applied to a surface of a touch-sensitive screen 103 of the gesture-based input device 101) associated with a particular controllable device UI element 106 (e.g. a user touch to the touch-sensitive screen 103 that corresponds to a location on the UI 102 where a controllable device UI element 106 is displayed). The user input 108A may be characterized by an at least substantially constant application of pressure (e.g. at no point does the user remove their finger from the surface entirely). Further, the user input 108A may be a substantially static user input (e.g. upon touching the touch-sensitive screen 103, a user's finger may remain in a substantially stationary location with respect to the touch-sensitive screen 103 the tracing of user input 108A). In the case, where the portion of the user input 108A is substantially static, the detection of that user input 108A may include detecting that the user input 108A has a threshold duration (e.g. 100 ms).

Figure 13:
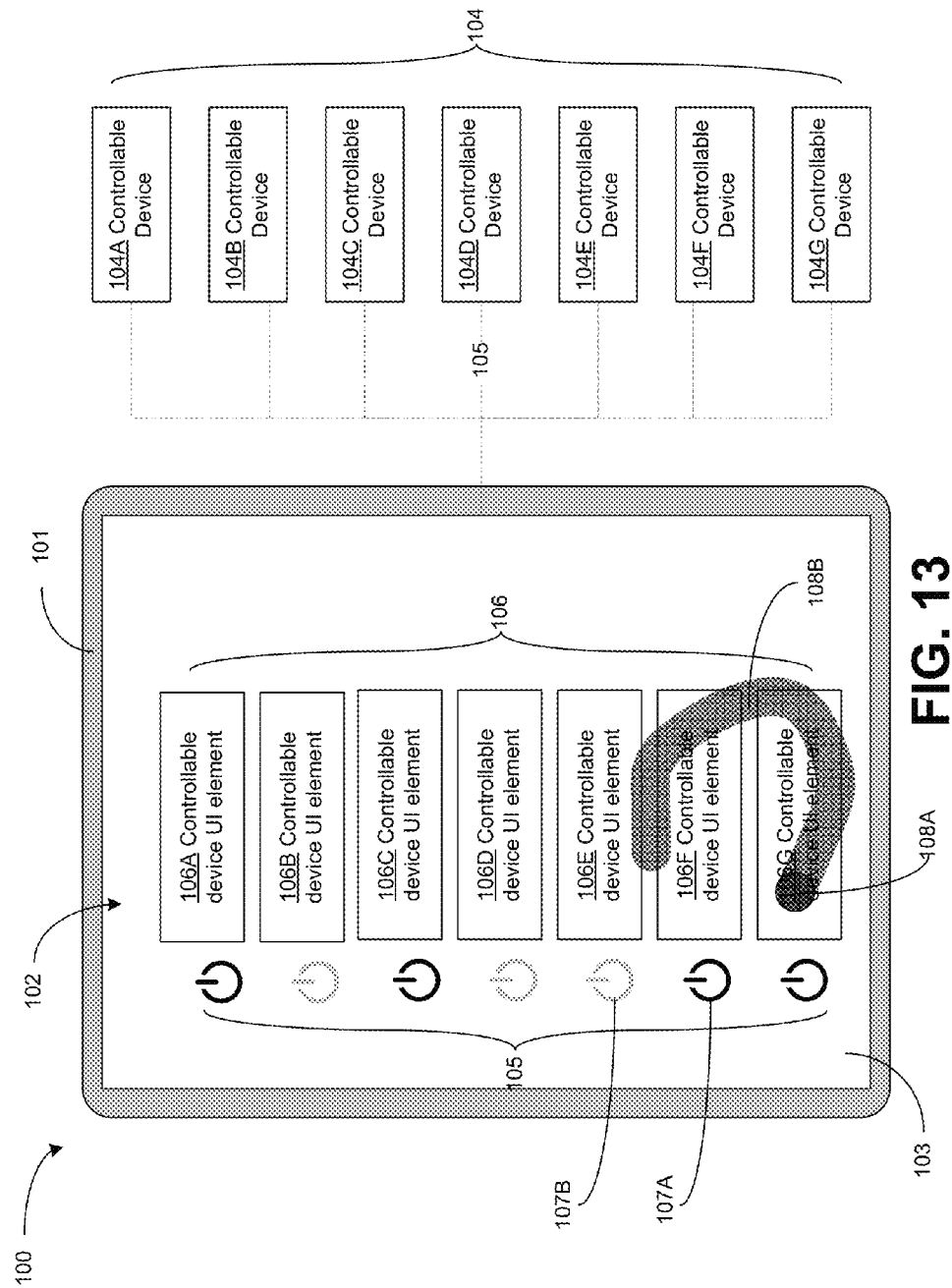
FIG. 13 depicts a system for controlling devices.

Operation 1120 illustrates detecting an at least partially dynamic second portion of the user input subsequent to the portion of a user input associated with an element of a graphical user interface associated with at least one controllable device. For example, as shown in FIG. 13, following the first portion of the user input 108A, the gesture-based input device 101 may receive a second portion of the user input 108B. The second portion of the user input 108B may be characterized by a continued at least substantially constant application of pressure directly following the user input 108A (e.g. a user maintains physical contact with the touch-sensitive screen 103 following the user input 108A and continues to provide user input 108B). Further, the second portion user input 108B may be a dynamic user input (e.g. upon touching the touch-sensitive screen 103, a user may move their finger across the touch-sensitive screen 103 in one or more directions such as shown by the tracing of user input 108B). It may be the case that the second portion of user input 108B includes the first portion of user input 108A (e.g. the threshold duration is very small, e.g. 5 ms).

Operation 1130 illustrates transmitting at least one device control signal to the at least one controllable device associated with the element of the graphical user interface. As described above, it may be desirable to control one or more controllable devices 104 according to touch-based inputs received by the gesture-based input device 101. As shown in FIGS. 12 and 13, upon receipt of first portion user input 108A, associated with controllable device UI element 106G and the second portion user input 108B, the gesture-based input device 101 may provide one or more control signals 105 to a controllable device 104G according to the first portion user input 108 and the second portion user input 108B. It may be the case that the control signals 105 are provided to the controllable device 104G only when the first portion user input 108A and the second portion user input 108B occur in direct sequence (e.g. a user maintains physical contact with the touch-sensitive screen 103 following the first portion user input 108A and then continues to provide the second portion user input 108B immediately or within a threshold amount of time).

Such a requirement of continuity between the first portion user input 108A and the second user input 108B may serve to distinguish device control operations initiated by the gesture-based input device 101 from non-device control operations associated with the controllable device UI element 106G. For example, it may be the case that, upon receipt of a first user input 108A that is discontinuous with the second user input 108B (e.g. a user depresses the touch-sensitive screen 103 following first user input 108A prior to pressing the touch-sensitive screen 103 to initiate second user input 108B) the gesture-based input device 101 may execute one or more non-device control operations. Such non-device control operations may include displaying a second graphical user interface hierarchically dependent from the element of the graphical user interface associated with the controllable device in response to the first user input when the first user input and the second user input are non-contemporaneous. For example, upon receipt of a first user input 108A that is not contemporaneous with the second user input 108B, the gesture-based input device 101 may display a second UI that is hierarchically dependent from the controllable device UI element 106 selected by the first user input 108A (e.g. the second UI may provide a "drill-down" view including UI elements specific to a controllable device 104 associated with the controllable device UI element 106 selected by the first user input 108A such as power status, operating temperature, data processing rates, I/O error status, and the like).

As described above with respect to FIGS. 3-10, the specific nature of the control signals 105 provided by the gesture-based input device 101 to a controllable device 104 may be a function of the particular user movements associated with those user inputs. Such control signals 105 may be provided in response to the single-finger input methods as described below with respect to FIGS. 14-18.

Figure 14:
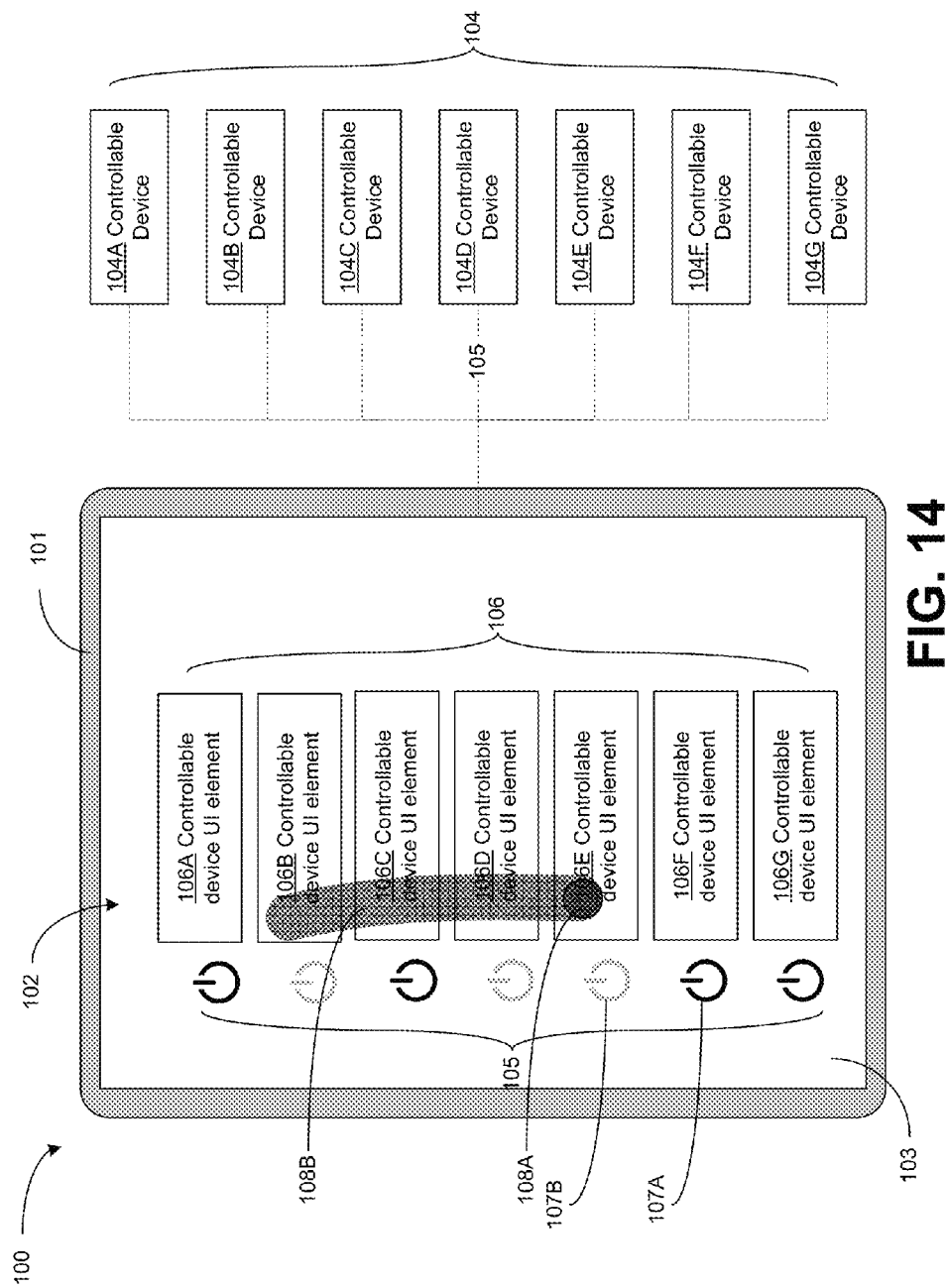
FIG. 14 depicts a system for controlling devices.

For example, as shown in FIG. 14, the second portion user input 108B may trace an at least partially circular shape. Detection of such an at least partially circular second portion user input 108B may cause the gesture-based input device 101 to provide one or more control signals 105 to a controllable device 104 directing the controllable device 104 to power off.

Figure 15:
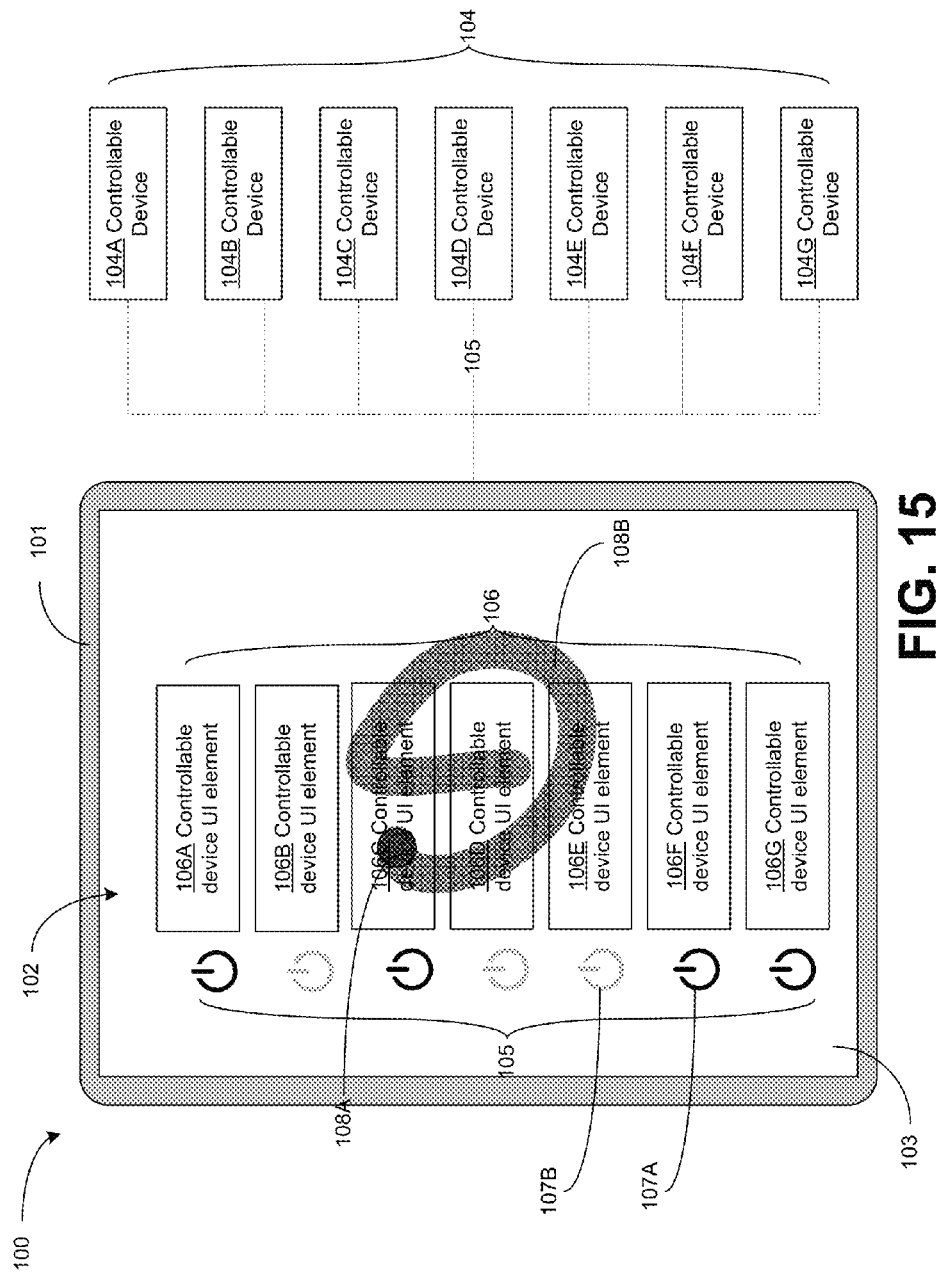
FIG. 15 depicts a system for controlling devices.

Still further, as shown in FIG. 15, the second portion user input 108B may trace a substantially vertical linear shape. Detection of such a substantially vertical linear second portion user input 108B may cause the gesture-based input device 101 to provide one or more control signals 105 to a controllable device 104 directing the controllable device 104 to power on.

Figure 16:
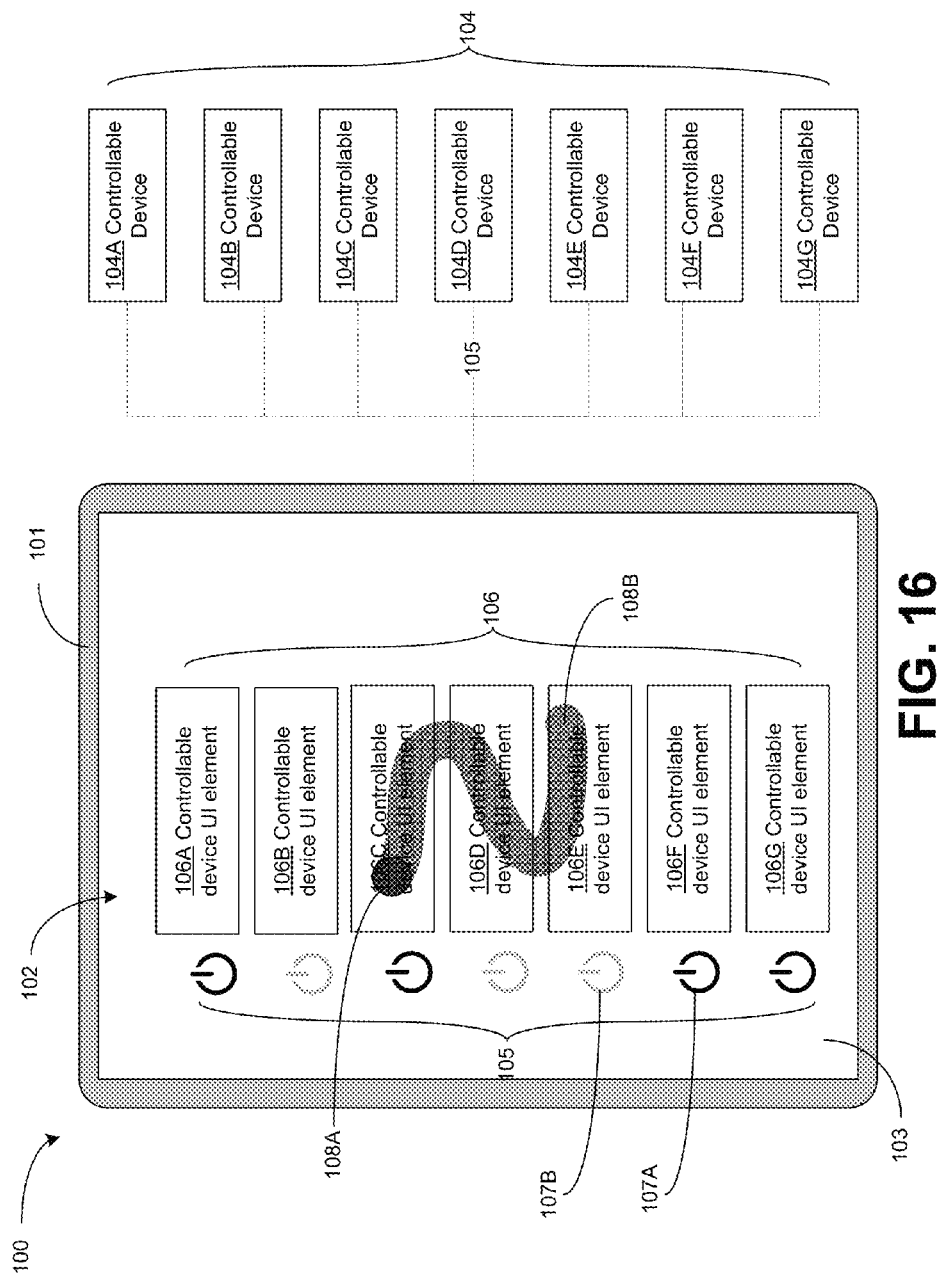
FIG. 16 depicts a system for controlling devices.

Still further, as shown in FIG. 16, the second portion user input 108B may trace a substantially circular shape followed by a substantially vertical linear shape. Detection of a second portion user input 108B including a substantially circular shape followed by a substantially vertical linear shape may cause the gesture-based input device 101 to provide one or more control signals 105 to a controllable device 104 directing the controllable device 104 to restart.

Figure 17:
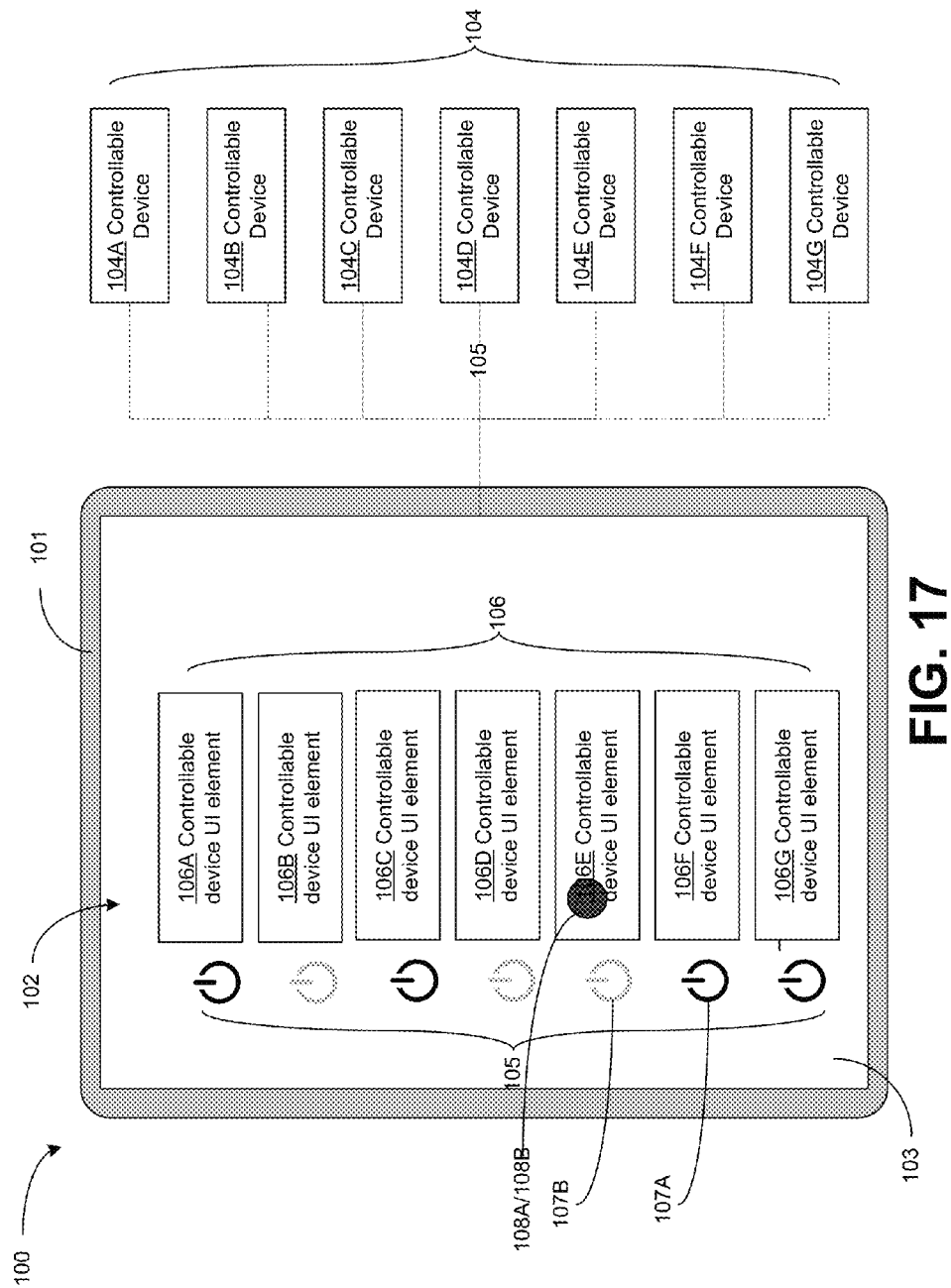
FIG. 17 depicts a system for controlling devices.

Still further, as shown in FIG. 17, the second portion user input 108B may provide a substantially z-shaped input. Detection of a substantially z-shaped second portion user input 108B may cause the gesture-based input device 101 to provide one or more control signals 105 to a controllable device 104 directing the controllable device 104 to enter a sleep mode.

Figure 18:
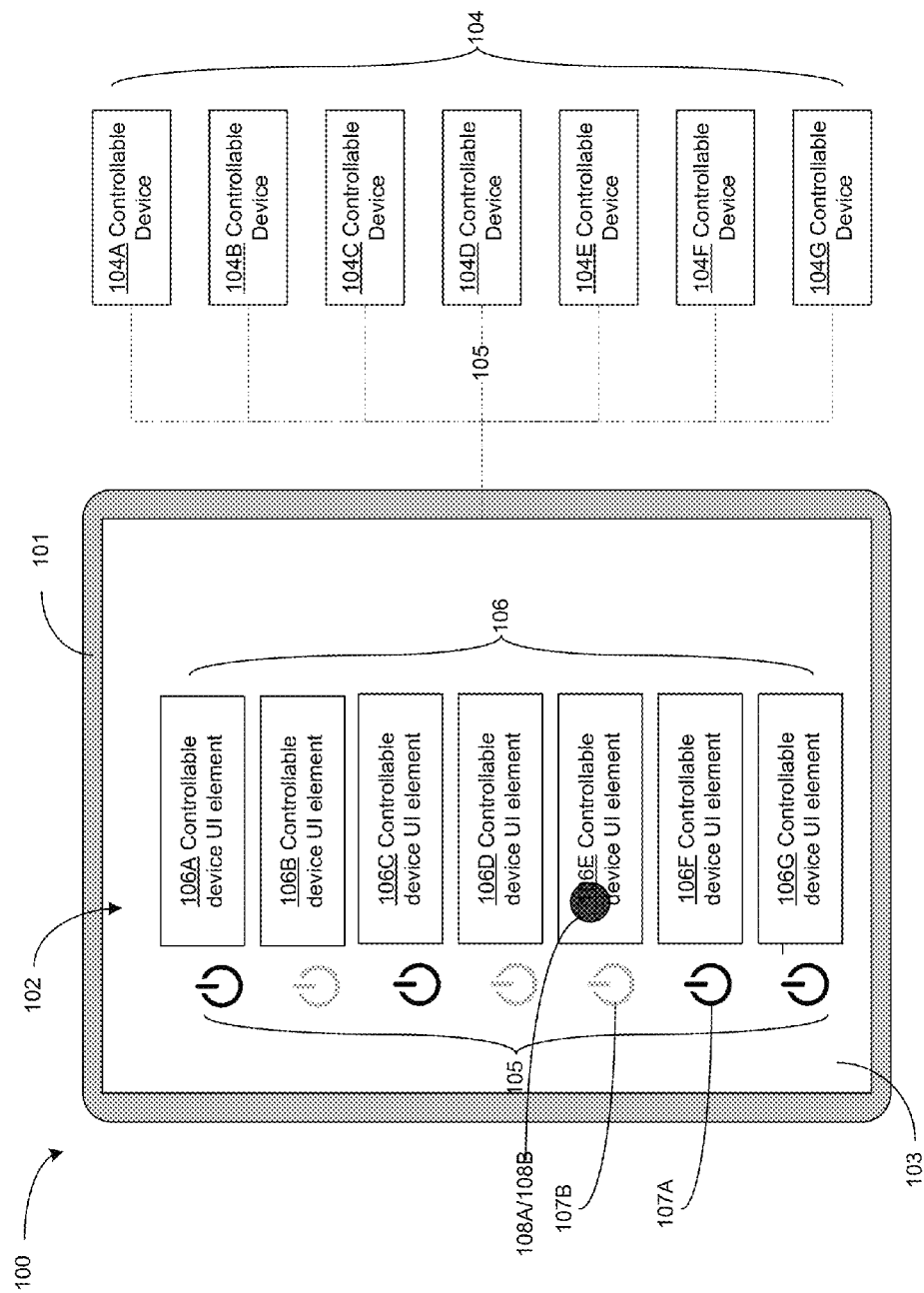
FIG. 18 depicts a system for controlling devices.

Still further, as shown in FIG. 18, the second portion user input 108B may provide a triple-tap input (e.g. a repetition of three substantially proximate tap-type user inputs within a threshold period of time). Detection of a triple-tap second portion user input 108B may cause the gesture-based input device 101 to provide one or more control signals 105 to a controllable device 104 directing the controllable device 104 to exit a sleep mode.

Figure 19:
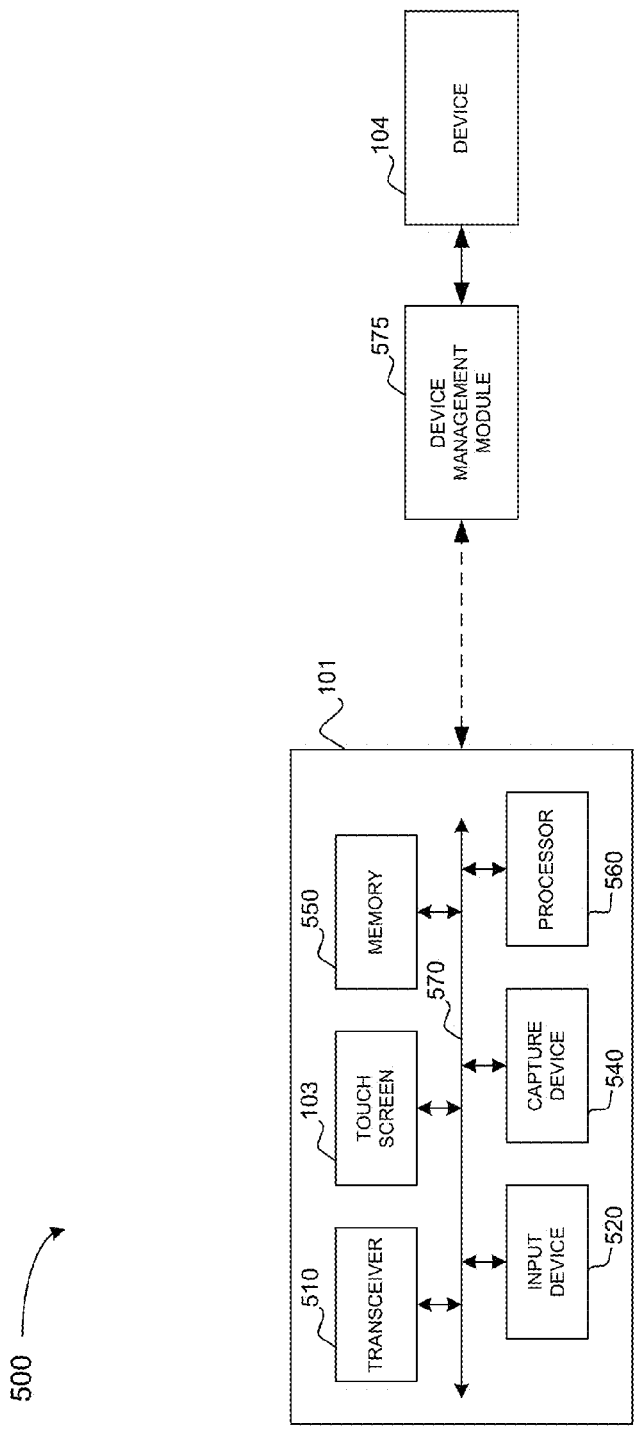
FIG. 19 depicts a system for controlling devices.

FIG. 19 depicts an exemplary system 500 for controlling one or more controllable devices 104. At least in the illustrated embodiment, system 500 comprises a device management module 575 configured to control at least one controllable device 104. The device management module 575 may be external to or included as a portion of controllable device 104. The system 500 further comprises a gesture-based input device 101 in communication with device management module 575.

At least in the illustrated embodiment, gesture-based input device 101 comprises a transceiver 510, one or more input devices 520, a touch-sensitive screen 103, one or more capture devices 540, a memory 550, and a processor 560 coupled to one another via a bus 570 (e.g., a wired and/or wireless bus).

The transceiver 510 may be any system and/or device capable of communicating (e.g., transmitting and receiving data and/or signals) with device management module 575. The transceiver 510 may be operatively connected to device management module 575 via a wireless (e.g. Wi-Fi, Bluetooth, cellular data connections, etc.) or wired (Ethernet, etc.) connection.

The one or more input devices 520 may be any system and/or device capable of receiving input from a user. Examples of input devices 520 include, but are not limited to, a mouse, a key board, a microphone, a selection button, and the like input devices. In various embodiments, each input device 520 is in communication with touch-sensitive screen 103. In other embodiments, touch-sensitive screen 103 is itself an input device 520.

In various embodiments, touch-sensitive screen 103 may be configured to display data received from controllable devices 104, device management module 575, input devices 520, one or more capture devices 540, etc.

The capture devices 540 may be any system and/or device capable of capturing environmental inputs (e.g., visual inputs, audio inputs, tactile inputs, etc.). Examples of capture devices 540 include, but are not limited to, a camera, a microphone, a global positioning system (GPS), a gyroscope, a plurality of accelerometers, and the like.

The memory 550 may be any system and/or device capable of storing data. In one embodiment, memory 550 stores computer code that, when executed by processor 560, causes processor 560 to perform a method for controlling one or more controllable devices 104.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for controlling devices comprising:
   detecting a first user input associated with an element of a graphical user interface associated with at least one controllable device;
   detecting at least one second user input; and
   transmitting at least one device control signal to the at least one controllable device associated with the element of the graphical user interface when the first user input and the second user input are at least partially contemporaneous.

2. The method of claim 1, further comprising:
   displaying a second graphical user interface hierarchically dependent from the element of the graphical user interface associated with the controllable device in response to the first user input when the first user input and the second user input are non-contemporaneous.

3. The method of claim 1, wherein at least one of the first user input and the second user input is a touch input to a touch-screen displaying the graphical user interface element.

4. The method of claim 1, wherein the first user input is a substantially static input with respect to the graphical user interface element; and wherein the second user input is an at least partially dynamic input with respect to the graphical user interface element.

5. The method of claim 1, wherein the at least one device control signal causes the controllable device to perform at least one operation selected from:
   powering on; powering off; restarting; entering a sleep state; exiting a sleep state; throttling down; and throttling up.

6. The method of claim 1, wherein the controllable device is at least one of a server device, a server tray, and a server rack.

7. A system for controlling devices comprising:
   means for detecting a first user input associated with an element of a graphical user interface associated with at least one controllable device;
   means for detecting at least one second user input; and
   means for transmitting at least one device control signal to the at least one controllable device associated with the element of the graphical user interface when the first user input and the second user input are at least partially contemporaneous.

8. A method for controlling devices comprising:
   detecting a first portion of a user input associated with an element of a graphical user interface representing at least one controllable device;

detecting an at least partially dynamic second portion of the user input subsequent to the first portion of the user input; and transmitting at least one device control signal to the at least one controllable device represented by the element of the graphical user interface.

9. The method of claim 8, wherein the detecting a first portion of a user input associated with an element of a graphical user interface representing at least one controllable device comprises:

detecting an at least substantially static first portion of a user input having a threshold duration.

10. The method of claim 9, wherein the substantially static first portion of a user input and the at least partially dynamic second portion of the user input include a single continuous touch-screen contact.

11. The method of claim 8, further comprising:

displaying a second graphical user interface hierarchically dependent from the element of the graphical user interface associated with the controllable device in response to the portion of the user input associated with the element of the graphical user interface associated with the at least one controllable device when the portion of the user input associated with the element of the graphical user interface associated with the at least one controllable device and the at least partially dynamic portion of the user input are discontinuous.

12. The method of claim 8, wherein the first portion of a user input and the least partially dynamic second portion of the user input are touch inputs to a touch-screen displaying the element of the graphical user interface element associated with at least one controllable device external to a device receiving the user input.

13. The method of claim 8, wherein the at least one device control signal causes the controllable device external to a device receiving the user input to perform at least one operation selected from:

powering on; powering off; restarting; entering a sleep state; exiting a sleep state; throttling down; and throttling up.

14. The method of claim 8, wherein the controllable device external to a device receiving the user input is at least one of a server device, a server tray, and a server rack.

15. A system for controlling devices comprising:

means for detecting a first portion of a user input associated with an element of a graphical user interface representing at least one controllable device;

means for detecting an at least partially dynamic second portion of the user input subsequent to the first portion of the user input; and means for transmitting at least one device control signal to at least one controllable device represented by the element of the graphical user interface.

16. The method of claim 8, wherein the detecting a first portion of a user input an element of a graphical user interface associated with representing at least one controllable device includes:

detecting a first portion of a user input an element of a graphical user interface associated with representing at least one controllable device external to a device receiving the user input.

17. The method of claim 8, wherein the element of a graphical user interface representing at least one controllable device includes:

at least one of a graphical or textual representation of the at least one controllable device.

* * * * *